Feb. 10, 1959  E. C. GEAR  2,873,048
ELECTROSTATIC CONVEYING
Filed Oct. 23, 1953
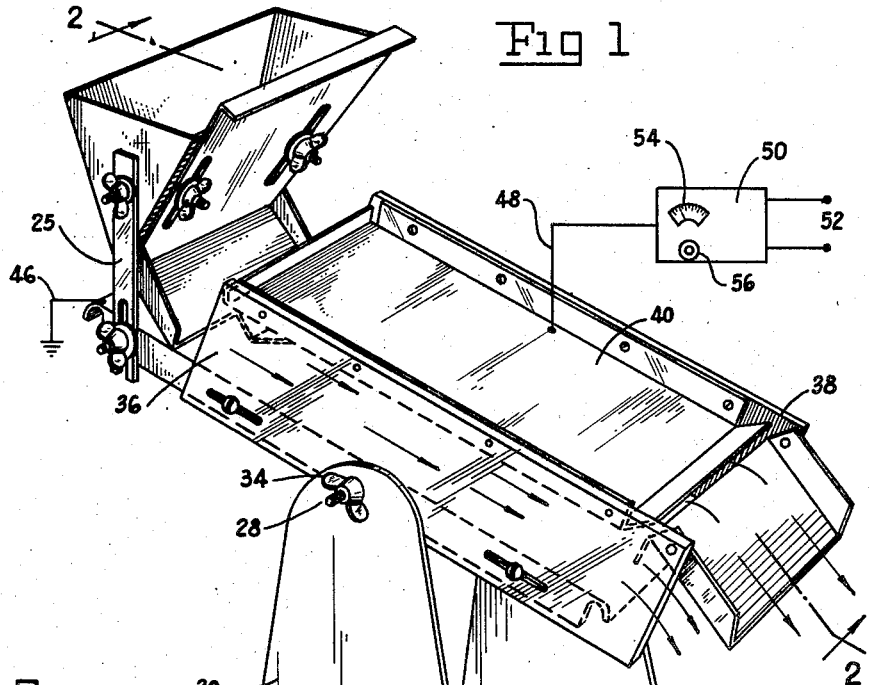
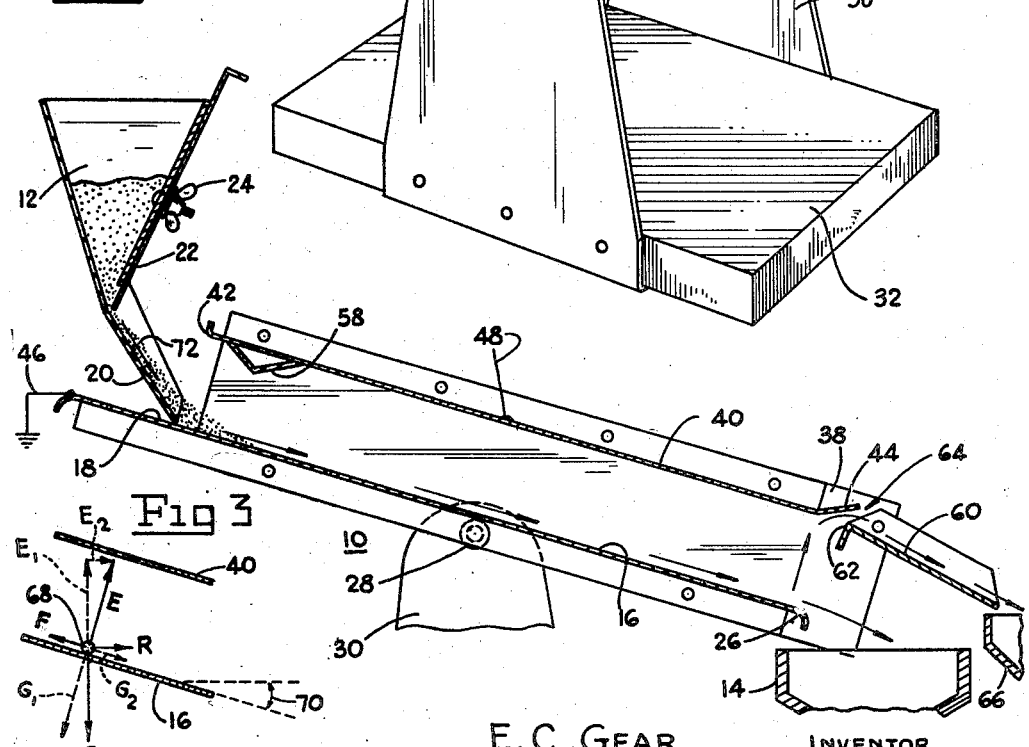
E. C. GEAR INVENTOR
BY William C. Babcock ATTORNEY United States Patent Office 2,873,048
Patented Feb. 10, 1959

2,873,048

ELECTROSTATIC CONVEYING

Eli C. Gear, Minneapolis, Minn., assignor to General Mills, Inc., a corporation of Delaware Application October 23, 1953, Serial No. 387,993

11 Claims. (Cl. 222—1)

The present invention relates to the conveying field and more particularly to methods and apparatus for conveying materials with the aid of electrostatic forces.

Conveying chutes or slides are well known in which particles of material are fed to one point of the chute and then slide downwardly along the chute toward a second or outlet point under the influence of gravity. For many types of particles, particularly in the case of powdered materials or finely ground substances, it is necessary to incline the chute or conveyor at a substantial angle in order to maintain the movement of the particles from the first point to the second. In effect, the inclination of such a chute downwardly from the first point to the second point must be at a substantially greater angle than the normal angle of repose of the particular material. If this downward inclination must be steep, then it is necessary to convey the material through relatively great vertical distances in order to obtain a desired lateral movement. In processes in which the material is to be moved through a plurality of processing stations as, for example, in the flour milling field, this may require the use of buildings many stories high and the repeated elevation of the material from the bottom to the top of the building in order to permit successive downward conveying runs from step to step of the process.

With these problems of the prior art in view, it is one object of the present invention to provide novel methods and apparatus for conveying materials laterally with a minimum of downward vertical displacement and without the use of substantial moving parts such as conveying belts, buckets, or the like.

A further object of the invention is a conveyor in which the material is moved along a supporting deck or chute which is inclined downwardly less steeply than the normal angle of repose of the material.

Another object is such a conveyor in which electrostatic forces are utilized to make possible the use of more gentle inclinations than could possibly serve to convey the material in the absence of such forces.

Still another object is the provision of such a conveyor in which electrostatic forces are used to reduce substantially the effective angle of repose of the materials which are subjected to such forces.

Another object is the provision of such a conveyor with means for separating those particles which are not only moved along the conveyor from one point to another by the aid of electrostatic forces, but are also attracted a predetermined distance above the chute by the time they reach the end of it.

Other objects and advantages will be apparent from the following specification in which certain preferred embodiments of the invention have been described with particular reference to the accompanying drawings.

In these drawings, wherein like reference characters indicate like parts,

Figure 1 is a perspective view of an electrostatic conveying apparatus according to the present invention;

Fig. 2 is a partial sectional view on the line 2—2 of Fig. 1, with certain of the supporting base portions omitted and with certain of the collecting means added, and Fig. 3 is a partial schematic view showing a portion of the device of Fig. 2 with an indication of the various forces acting on a given particle of material.

In general, I have found that the above objects can be accomplished by conveying methods and apparatus in which a stationary conveying deck or chute is inclined downwardly at an angle less than the normal angle of repose of the particular material to be conveyed, in combination with a provision of an electrostatic field above the deck which will exert electrostatic forces having a substantial vertical component tending to at least partially offset the downward pull of gravity on the particles and thus decrease the frictional forces which tend to hold the particles in a stationary condition on the chute and prevent their downward movement along the gentle slope of the deck.

Thus the conveyor shown in Figs. 1 and 2 is indicated generally at 10 and is adapted to convey material which is supplied from a feed hopper 12 or equivalent supply device or chute at one end of the conveyor to a receiving receptacle or hopper or further chute 14 at the other end of the conveyor. The conveyor itself includes a deck 16 having a first or upper end 18 located beneath the spout 20 which feeds material to the chute from the hopper 12.

The rate of feed of material to the conveyor may be controlled by an adjustable gate 22 which is clamped in its adjusted position by suitable means 24. The downwardly inclined deck 16 extends from this first point 18 beneath the spout 20 to a second point 26 at the opposite end of the chute. At this second point 26 the chute or deck may be provided with a downwardly extending lip or discharge spout which directs the conveyed material into the receiving hopper or chute 14, which may be associated with a suitable processing apparatus.

In the particular apparatus illustrated in the drawings, the conveying deck 16 is pivotally supported on a horizontal axis or shaft at 28 to permit relative adjustment of the angle of downward inclination from the first point or end 18 of the deck to the second point or end 26 of the deck. The pivotal axis 28 is supported or trunnioned in bearing members or supports 30 which extend upwardly from a suitable base 32. Clamping means, such as the nut 34, permit changes in the adjustment of the inclination of the deck and secure the deck in its adjusted position.

According to the invention, means are provided for maintaining an electrostatic field above the deck 16. In this case the field-producing means is supported on insulating side plates 36 and 38 which extend longitudinally of the deck at each side thereof and which are secured thereto. The upper edges of these side plates 36 and 38 serve to support an upper electrode 40 which is unperforated and extends substantially parallel to the deck 16 throughout the area between the inlet point 18 and the discharge point 26. Thus the upper electrode 40 has a first end 42 located generally above the point at which material is fed to the deck 16 and a second end 44 located above the discharge point 26 of the lower deck. As illustrated in Fig. 2, the discharge edge 44 of the upper electrode is inclined slightly away from the lower deck.

In order to provide the desired electrostatic field between the deck 16 and upper electrode 40, the upper surface of deck 16 is made of electrically conducting material. The means providing the necessary relative potential includes in this case the wire 46 connecting the upper surface of deck 16 to ground, and a wire 48 electrically connecting the upper electrode 40 to a power pack 50 or other source of potential. In this case the potential source 50 is connected to supply lines 52 and includes a meter or indicator 54 and adjusting means 56 by which the relative difference of potential between the upper electrode 40 and deck 16 may be adjusted and maintained at any preselected level.

According to another feature of the present invention, the field-producing means includes means for maintaining a more intense electrostatic field at the first or inlet end of the conveying deck than along the remainder of the deck. The purpose of this more intense field at the inlet end is to insure a starting or initial movement of the particles of material along the deck. The particular means illustrated in the drawings to obtain this more intense field includes a projection on the undersurface of the upper electrode at 58. This projection extends downwardly toward the deck 16 at the point where material is first fed to the deck. Since the portion 58 is maintained at the same potential as the remainder of electrode 40, and since the spacing between this portion 58 and the lower deck 16 is smaller than the spacing between the remaining portions of electrode 40 and the deck, a more intense electrostatic field will be maintained at this inlet end. Thus initial movement of the material from the first end of deck 16 will be assured. In this connection it will be noted that the projection 58 includes surfaces which are gently sloped in both directions along the path of feed to avoid the presence of sharp edges and provide a relatively gentle transition from the region of maximum field intensity to the portions of the field extending along the major area of the electrode.

According to another aspect of the present invention, it has been found that when material is conveyed in the manner just described under the influence of electrostatic forces at angles less than the normal angle of repose or angle which would cause movement of the material in the absence of the field, it is possible with certain types of material to provide an advantageous separation between different types of particles. In this case those particles which are more susceptible to electrostatic attraction under particular conveying conditions may tend to reach a point substantially above the surface of deck 16 which determines the normal conveying path for the majority of the material.

Thus it is possible to provide a separating means indicated at 60 which has a lip or edge 62 defining the distance above deck 16 which particles must reach in order to be separated. Those particles which are so attracted by the electrostatic field as to move close to the upper electrode 40 by the time they reach the lower end of the conveyor must pass through the slot or opening 64 above the edge 62 and beneath the end 44 of the upper electrode 40. These particles will then pass along the upper surface of the separating member 60 and may be collected in a suitable receptacle or hopper 66. This separation feature of the present invention is particularly useful in the case of materials having different types of particles, at least one of which is sufficiently susceptible to electrostatic attraction to reach the predetermined distance above deck 16 as defined by the separating edge 62 of member 60.

The operation of the apparatus described above is believed to be readily apparent from the foregoing description. By way of further explanation of the theory of operation of the device, reference is made to Figure 3 in which a single particle 68 is illustrated on the lower deck 16 with an indication of the various forces tending to act on this particle. In the absence of any electrostatic field, the only force on the particle, since deck 16 is substantially stationary, would be the downward force of gravity indicated by the vertically downwardly extending arrow G. For convenience this force may be thought of as having two components, namely a component $G_1$ perpendicular to the deck 16 and a component $G_2$ parallel to the deck. The component $G_2$ would normally tend to slide the particle 68 along the deck, but this tendency would be resisted by the frictional force indicated schematically by the arrow F. This retarding or frictional force F is dependent, of course, on the particular coefficient of friction of the particle 68 on the surface 16 and also on the magnitude of the gravity component $G_1$ perpendicular to deck 16.

In the cases involved in the present invention, the lower deck 16 is inclined downwardly at an angle indicated at 70 in Figure 3 which is less than the normal angle of repose of the material. This normal angle of repose might be thought of as illustrated by the surface 72 assumed by the particles of material as they leave the supply hopper 12 and before they are influenced by the electrostatic field. Reference to the angle of repose is simply another way of saying that the frictional forces represented by the arrow F in Figure 3 are effectively greater than the forces represented by the gravity component $G_2$. Thus the particle 68 would remain stationary on deck 16 and would not move from one end to the other.

The addition of the electrostatic field, however, provides an electrostatic force which acts generally in an upward direction perpendicular to the deck 16 as illustrated by the arrow E of Figure 3. The magnitude of this force depends on the field strength, i. e., on the relative difference of potential per unit of perpendicular distance between the deck 16 and electrode 40. This electrostatic force E may, if desired, be thought of as having a substantially vertical component $E_1$ directly opposed to the downward force of gravity G, plus a horizontal component of electrostatic force $E_2$ tending to move the particle 68 horizontally from left to right in the figure, i. e., generally in the direction of desired conveying movement. Or, if desired, the force E may be thought of as directly opposing the perpendicular gravity component $G_1$ and thus partially or completely off-setting that portion of the gravity force which results in frictional retarding forces indicated by the arrow F.

In either event, it will be apparent that the combination of gravity and electrostatic forces will produce a resultant or net force on particle 68, the direction and magnitude of which depend on the relative strength and direction of the electrostatic force E as compared to the gravity force G. If the electrostatic force is great enough, the resultant may be in the direction generally indicated by the arrow R of Figure 3 so that the particle 68 will tend to move downwardly along the deck 16. Whether the particle will merely move along the deck or will be at the same time carried along a path approaching the upper deck will, of course, depend on the particular electrostatic susceptibility of the type of particle involved and again on the relative strength and direction of the respective forces.

By way of example, a conveyor of the type shown in Figs. 1 and 2 was used to convey a flour milling stock of the type known as coarse first middlings. This stock, which is obtained in the process of grinding wheat to produce flour, includes some particles of relatively pure endosperm, some of almost pure bran, and a wide range of intermediate particle types in which endosperm and bran are attached in varying proportions.

The angle of repose of the stock was of the order of 35°. By application of suitable voltages in the device of Figs. 1 and 2, however, satisfactory conveying could be achieved at slopes of 10° to 30° below the horizontal, i. e., slopes at which the stock would not slide or move in the absence of electrostatic forces. For this particular operation a negative potential of 7,000 volts was maintained on the upper electrode, with a perpendicular distance of seven-eighths of an inch between the lower deck and upper electrode. It is interesting to note that at slopes in the higher end of the range, i. e., from say 25° to 30°, the application of electrostatic forces resulted in what appeared to be a sliding of the particles. In the lower end of the range, however, from 10° to 25°, the field seemed to provide an actual lifting of the particles to support their movement longitudinally of the device. In any event, it is clear that the application of electrostatic forces makes possible the conveying of stocks at angles much smaller than the normal angle of repose of the material and that variation in the field strength may be used to adjust the precise rate of conveying in a given case.

According to the foregoing description, a method and apparatus for electrostatic conveying have thus been provided which substantially accomplish the objectives set forth at the beginning of this specification. Since minor variations and changes in the exact details of construction will be apparent to persons skilled in this field, it is intended that this invention shall cover all such changes and modifications as fall within the spirit and scope of the attached claims.

Now, therefore, I claim:

1. The method of conveying particles of electrostatically susceptible material from a source of supply which comprises feeding the material from said source onto a support which is inclined downwardly from a first point to a second point at an angle less than the normal angle of repose of the material, and maintaining an electrostatic field of predetermined direction and strength above said support, the maintaining of said electrostatic field in combination with the effect of gravity and inclination of the support constituting the sole method of supporting movement of the material downwardly along said support.

2. A method for feeding and dispensing particulate materials which comprises: passing said particulate material from a source of supply onto a downwardly sloping substantially planar, imperforate surface, adjusting the angle of slope of said surface to slightly less than the angle of repose of said particulate material, and subjecting the particles fed to said sloping surface to an electrostatic field whose lines of force cut across said surface, whereby said particulate material is caused to move down said sloping surface and to be dispensed over the lower end of said surface in a dispersed condition.

3. A method for feeding and dispensing particulate material without use of any mechanically moving feeding apparatus which comprises: providing a source of particulate material; discharging by gravity particles from said supply source onto a sloped imperforate surface positioned at an angle slightly less than the angle of repose of said particulate material; and subjecting the particles discharged onto said sloped surface to an electrostatic field whose lines of force cut across said sloped surface, whereby said particulate material is caused to move down said sloped surface and to be dispensed over the lower end of said surface in a dispersed condition.

4. A method for feeding and dispensing particles of dielectric material which comprises: providing a source of supply of said particles; discharging said particles from said source of supply onto a sloping imperforate surface, the angle of slope of said surface being slightly less than the angle of repose of said particles; establishing an electrostatic field across such surface with the lines of force of said field running substantially normally to said sloping surface, whereby said particles are caused to pass downwardly across said surface; and regulating the rate of feeding of said particles across said surface by controlling the potential of said electrostatic field.

5. A method for feeding and dispensing particles of dielectric material which comprises: providing a source of said particles; allowing said particles to feed by gravity from said source onto a sloping imperforate surface, said surface being positioned relative to the horizontal at slightly less than the angle of repose of said particles; establishing an electrostatic field substantially normally to said surface between electrode means positioned above and below said surface; and regulating the rate of feeding of said particles across said surface by controlling the potential of said electrostatic field.

6. Apparatus for feeding and dispensing particulate material comprising: a hopper for particulate material; an imperforate member positioned below said hopper; a discharge opening in the lower portion of said hopper; means for guiding particles discharged from said hopper onto the top surface of said member, said member being provided with means for adjusting the top surface thereof to an angle relative to the horizontal slightly less than the angle of repose of particulate material charged into said hopper; and means for establishing an electrostatic field across said member with lines of force of said field running predominantly normally to the top surface of said member.

7. Apparatus for feeding and dispensing particulate material without use of vibrating or oscillating screens or trays which comprises: a source of supply for particulate material; a sloping imperforate member positioned to receive particles from said source of supply onto its top surface; means to adjust the angle of slope of said member to slightly less than the angle of repose of particulate material contained in said source of supply; and means for establishing an electrostatic field across said member with lines of force running predominantly normally to top surface of said member.

8. Apparatus for feeding and dispensing particulate material without use of vibratory or oscillatory screens or trays which comprises: a source of supply for particulate material, a sloping imperforate member positioned to receive particles from said source of supply onto its top surface; means to maintain the angle of slope of said member at slightly less than the angle of repose of particulate material contained in said source of supply, and means for producing an electrostatic field across said member with lines of force running predominantly normally to the top surface of said member.

9. Apparatus according to claim 8 in which said field-producing means includes means maintaining a more intense electrostatic field at the upper end of the sloping member than along the remainder of said member, thereby insuring initial movement of such material from the first point.

10. An electrostatic conveyor according to claim 8 having manually adjustable means for selective variation of the strength of said field thereby controlling the rate of movement of said material.

11. An electrostatic conveyor having a stationary supporting deck along which desired particles of a desired material are to be fed from a first point to a second point, said deck being inclined downwardly from said first point to said second point at an angle less than the normal angle of repose of the desired material for the particular nature and operating conditions of the deck, and means providing an electrostatic field above said deck, said field having a direction and strength supporting movement of at least a portion of said material downwardly along the deck, said field-producing means including an upper electrode spaced above said deck and substantially parallel thereto, said deck having an electrically conducting upper surface, and said field-producing means further including means maintaining a relative electrical potential difference between said electrode and deck.

References Cited in the file of this patent

UNITED STATES PATENTS

| | | |
|---|---|---|
| 2,168,500 | Steinhauer | Aug. 8, 1939 |
| 2,382,122 | Wiegand | Aug. 14, 1945 |
| 2,615,570 | Morrison | Oct. 28, 1952 |
| 2,699,869 | Gear | Jan. 18, 1955 |